Feb. 23, 1937.  W. ZEH ET AL  2,071,374

SENSITIZING OF PHOTOGRAPHIC EMULSIONS

Filed July 8, 1932

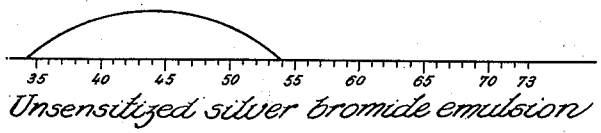

Fig.1. Unsensitized silver bromide emulsion

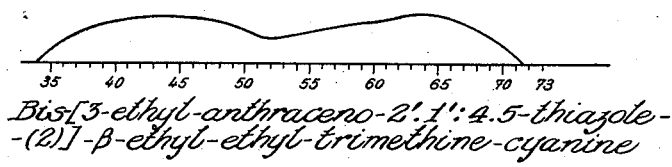

Fig.2. Bis-[3-ethyl-anthraceno-2'.1':4.5-thiazole-(2)]-β-ethyl-ethyl-trimethine-cyanine

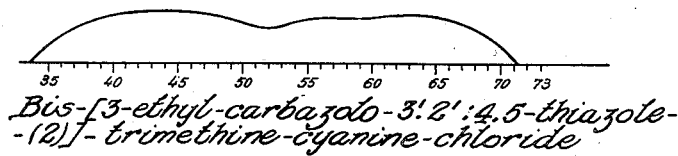

Fig.3. Bis-[3-ethyl-carbazolo-3'.2':4.5-thiazole-(2)]-trimethine-cyanine-chloride

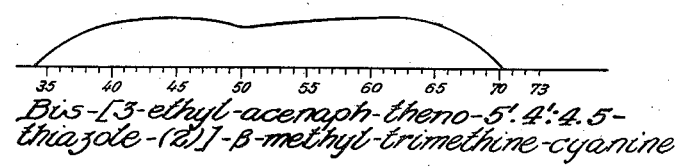

Fig.4. Bis-[3-ethyl-acenaph-theno-5'.4':4.5-thiazole-(2)]-β-methyl-trimethine-cyanine

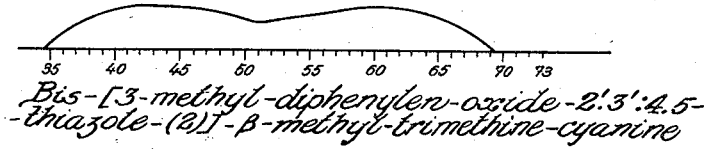

Fig.5. Bis-[3-methyl-diphenylen-oxide-2'.3':4.5-thiazole-(2)]-β-methyl-trimethine-cyanine Walter Zeh,
Willi Gaedke,
Martin Dabelow,
Werner Zerweck,
Inventors;

By Attorney
Philip S. Hopkins

Patented Feb. 23, 1937

2,071,374

UNITED STATES PATENT OFFICE 2,071,374

SENSITIZING OF PHOTOGRAPHIC EMULSIONS

Walter Zeh, Dessau in Anhalt, Willi Gaedke, Hofheim in Taunus, Martin Dabelow, Frankfort-Hochst, and Werner Zerweck, Frankfort-Fechenheim, Germany, assignors to Agfa Ansco Corporation, Binghamton, N. Y., a corporation of New York Application July 8, 1932, Serial No. 621,474
In Germany July 11, 1931

5 Claims. (Cl. 95—7)

Our present invention relates to sensitizing of photographic emulsion.

One of its objects is to provide such an emulsion the sensitivity of which is raised over the range of wave lengths to which the emulsion is normally sensitive. Further objects will be seen from the detailed specification following hereafter.

Reference is made to the accompanying drawing in which there are represented a few spectrograms of the same emulsion sensitized with our sensitizers.

Fig. 1 shows for the sake of comparison the spectrogram of the unsensitized silver bromide emulsion containing about 4% of silver iodide used for the tests.

Fig. 2 shows the spectrogram of the emulsion sensitized with bis-[3-ethyl-anthraceno-2'.1':4.5-thiazole-(2)]-β-ethyl-trimethine-cyanine bromide, Fig. 3 that of the emulsion sensitized with bis-[3-ethyl-carbazolo-3'.2':4.5-thiazole-(2)]-trimethine-cyanine-chloride.

Fig. 4 that of the emulsion sensitized with bis-[3-ethyl-acenaphtheno-5'.4':4.5-thiazole-(2)]-β-methyl-trimethine-cyanine bromide and Fig. 5 that of the emulsion sensitized with bis-[3-methyl-diphenyleneoxide-2'.3':4.5'-thiazole-(2)]-β-methyl-trimethine-cyanine chloride.

We have found that the thiocarbocyanines which derive from higher polynuclear cyclic compounds are well suitable for sensitizing to red and have over the hitherto known trimethine-cyanines the advantage of a higher intensity in the red of the spectrum.

As a starting material for the new sensitizing dyestuffs there may be used the 2-methyl thiazole of

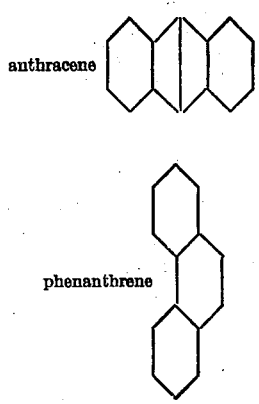

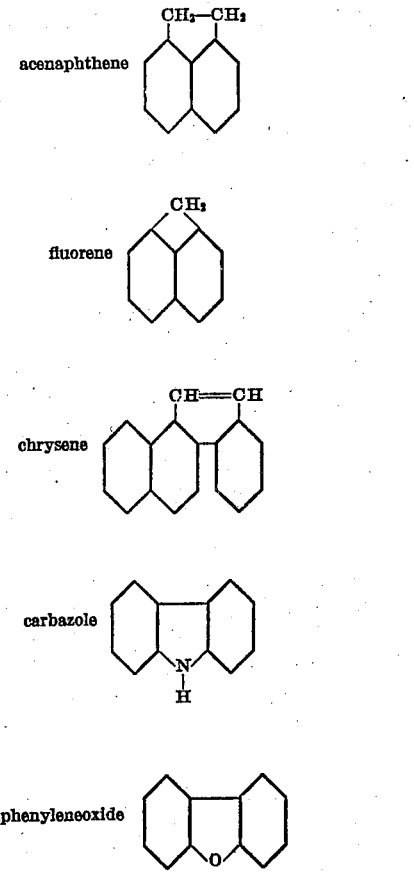

The dyestuffs are obtainable analogous to known methods. In order to prepare, for instance, the anthraceno-thiazole-trimethine-cyanines, one starts from alpha- or β-anthramine and, by way of its acetyl- and thioacet-compound, the 2-methylanthra thiazole is obtainable by oxidation with potassium ferricyanide. By treating the 2-methylanthrathiazole with diethylsulphate or ethyltoluene-sulphonate in known manner it is transformed into the quaternary compound which is then condensed in anhydrous pyridine to form a trimethine-cyanine by means of a trialkylorthocarboxylic acid ester. When condensing anthrathiazole with an alkylorthoformic ester there may be obtained carbocyanines of the following formulae (wherein R stands for an alkyl radical and X for an acid anion)

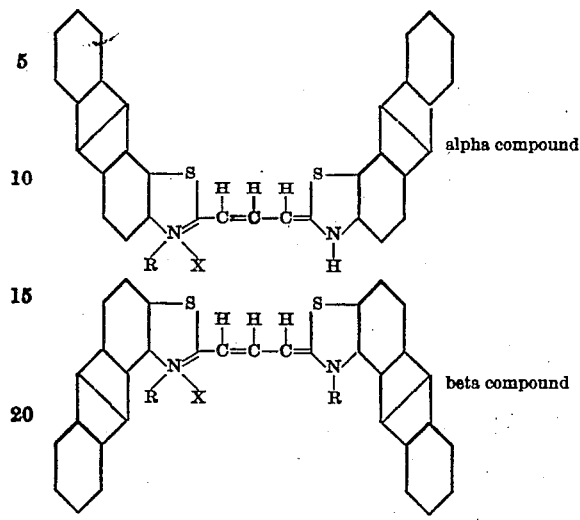

alpha compound beta compound

If the condensation is carried out with the ester of a higher orthocarboxylic acid the hydrogen of the central C-atom of the chain is substituted by an alkyl group. The dyestuffs substituted in this manner possess a more intensive sensitizing action, the compounds having a hydroxyalkyl substituent showing a better solubility in water. The scope of the invention is intended to include also such dyestuffs as are substituted in any manner in the anthracene etc. rings or in which the sulphur of the thiazole ring has been replaced by oxygen or selenium.

The new sensitizing dyestuffs are added to the emulsion in the usual concentrations (about 5 to 100 mgms. per kilo of emulsion) or are incorporated by the bathing process. The best amount can easily be determined by a few experiments. They are particularly suited for the manufacture of panchromatic emulsions.

The following examples serve to illustrate our invention more clearly. Examples 1 and 2 instance the manufacture of the bases our sensitizers are made from, the method of preparation being like that of the dyes analogous to known methods. Examples 3 to 8 demonstrate the manufacture of the dyes when starting from the bases.

*Example 1.*—2 - methyl - carbazolethiazole is prepared as follows:

9-benzoyl-3-amino-carbazole (melting point 148 to 150° C. is transformed into 9-benzoyl-2-aminothiazole according to the process described in U. S. Patents Nos. 1,787,315 and 1,787,316. This compound forms colorless needles having a melting point of 280° C. when recrystallized from glacial acetic acid. After cleaving the molecule according to the method indicated in U. S. Patent 1,788,297 o-mercapto-3-amino-carbazole is obtained, the benzoyl residue being split off at the same time. The compound is preferably separated in form of the zinc mercaptide. By heating the product with acetic anhydride and glacial acetic acid the 2-methyl-thiazole is obtainable, corresponding probably to the following formula:

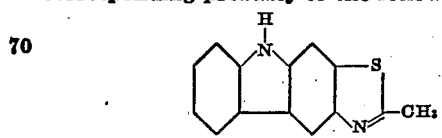

and forming when recrystallized from diluted alcohol colorless crystals which melt at 165° C.

*Example 2.*—For producing 2 - methyl - diphenyleneoxide-thiazole 2-amino-diphenyleneoxide is converted by the method described in U. S. Patent 1,788,297 into the amino-thiazole which crystallizes from hot diluted hydrochloric acid in the form of the chloride. By cleaving the molecule in an alkaline medium by the method described in U. S. Patent 1,788,297 the o-mercapto-2-amino-diphenyleneoxide is separated in form of its zinc mercaptide. When heated with acetic anhydride and glacial acetic acid this compound yields the 2-methyl-thiazole corresponding probably to the following formula:

and forming when recrystallized from diluted alcohol glittering crystals which melt at 162° C.

The bases may be converted into their quaternary ammonium-salts according to known general methods. For instance, the diethyl-sulfate is obtainable by heating the base and diethylsulfate for a short time, say about 10 minutes to about 130° C. The ethiodides of the bases may be obtained by boiling the base with ethyl iodide for a long time or by heating the base with ethyl iodide in a bomb tube to about 100° C.

*Example 3.*—The dye bis-[3-ethyl-anthraceno-2′.1′:4.5-thiazole-(2)]-β-ethyl - trimethine - cyanine-bromide corresponding probably to the formula:

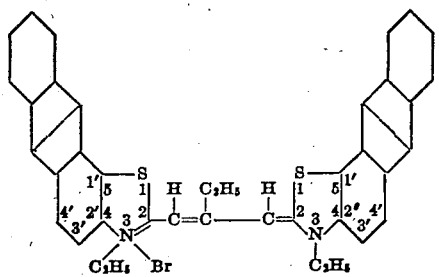

is obtained by heating 5 grams of 2-methyl-β-anthrathiazole-diethylsulfate in 10 cc. of dry pyridine with 5 cc. of tri-ethyl ortho propionate for about ½ hour to about 130° C. Hereon the dye is precipitated by addition of about 100 cc. of a 5 per cent solution of potassium bromide. By recrystallization from methanol a blackish-green crystalline powder is obtainable.

The alcoholic solution of the dye has an absorption maximum at a wave length of about 610μμ. A silver bromide emulsion containing about 4 per cent of silver iodide when sensitized with the dye acquires a sensibility to wave lengths of about 520–720μμ with a maximum at about 640μμ.

*Example 4.*—The dye bis-[3-ethyl-anthraceno-1′.2′:4′5-thiazole-(2)]-β-ethyl - trimethine - cyanine-bromide is produced by starting from 2-methyl-α-anthrathiazole-diethylsulfate, the reaction and the conditions being the same as in Example 3.

*Example 5.*—The dye bis-[3-ethyl-carbazolo-3′.2′:4.5-thiazole-(2)]-β - ethyl - trimethine-cyanine-chloride corresponding to the formula:

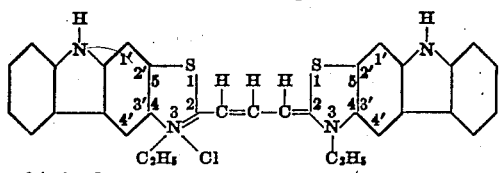

is obtainable as follows:

5 grams of 2-methylcarbazole-diethyl-sulfate are heated with 3 cc. of ethyl ortho formate in 10 cc. of pyridine for about ½ hour to 130° C. On the addition of sodium chloride the dye is precipitated from the blue solution. Recrystallization from methanol yields green little rods.

The alcoholic solution of the dye shows an absorption maximum at a wave length of about 605$\mu\mu$. A silver bromide emulsion containing about 4 per cent of silver iodide when sensitized with the dye acquires a sensibility for waves of about 510$\mu\mu$ to about 710$\mu\mu$ with a maximum at about 635$\mu\mu$.

*Example 6.*—The dye bis-[3-ethyl-acenaphtheno-5.'4': 4.5-thiazole-(2)]-$\beta$-methyl-trimethine-cyanine-bromide corresponding to the formula:

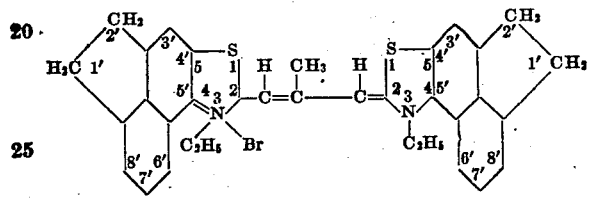

is obtainable by heating 3 grams of 2-methyl-acenaphthenethiazole-diethylsulfate in 10 cc. of dry pyridine with 3 cc. of ethyl ortho acetate for about ½ hour to 130° C. The dye is precipitated by adding to the reaction mixture about 100 cc. of a 5 per cent solution of potassium bromide. After recrystallization from methanol it forms small blue felted needles.

The alcoholic solution of the dye has an absorption maximum at about 585$\mu\mu$. A silver bromide emulsion containing about 4 per cent of silver iodide when sensitized with the dye acquires a sensitiveness for wave lengths of about 500$\mu\mu$ to about 710$\mu\mu$ with a maximum at about 625$\mu\mu$.

*Example 7.*—The dye bis-[3-ethyl-diphenyleneoxide-2'.3':4.5-thiazole-(2)]-$\beta$-methyl-trimethine-cyanine-chloride corresponding to the formula

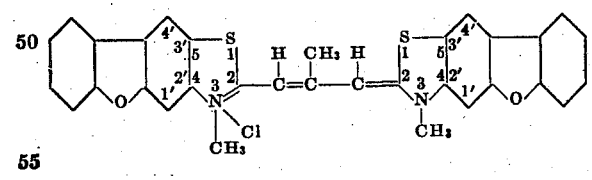

may be produced by heating 2.5 grams of diphenyleneoxide-2-methylthiazole and 4 cc. of ethyl-ortho-acetate with 10 cc. of pyridine for about ½ hour to 130° C. The dye which precipitated already during the heating operation in the form of its sulfalkylate is separated from the mother liquid by suction. The dye is then dissolved in methanol and precipitated by addition of a 10 per cent solution of common salt.

The alcoholic solution of the dye shows an absorption maximum at a wave length of about 585$\mu\mu$. A silver bromide emulsion containing about 4 per cent of silver iodide when sensitized with the dye acquires a sensibility to wave lengths of about 510$\mu\mu$ to about 690$\mu\mu$ with a maximum at about 615$\mu\mu$.

The dyes are obtainable according to the desired solubility in form of the bromide, iodide, perchlorate, etc., and are used in a quantity such as is usual for the known sensitizing dyes. This quantity may amount to about 10 to 50 milligrams per 1 kilo of emulsion ready for being cast, which contains about 9 per cent of gelatin and 4.5 per cent of silver halide, the rest being water. However, the invention is not limited to the quantities just indicated and the most suitable amount can in each case be found by a few comparative experiments. The dyes may be added to the emulsion in form of solutions; suitable solvents are the alcohols, for instance, methyl or ethyl alcohol, which may be used in anhydrous form or diluted with water. The dyes may be applied to the emulsion during any stage of its production but are preferably added to the finished emulsion before it is cast.

For example, to 1 kilo of a liquid emulsion ready for being cast there are added 30 milligrams of 1.1'-diethyl-$\beta$-anthrathio-mesoethyl-carbocyanine-bromide dissolved in 120 cc. of methanol or alcohol, while thoroughly stirring. After the added solution of sensitizer has been uniformly distributed in the liquid emulsion stirring is discontinued and the mass is allowed to stand. After a short time, say 5 minutes, it may be cast.

The dyes may likewise be incorporated in the emulsion by coating, or by bathing the finished photographic material in a solution of the dye. Such a treatment may be as follows: The photographic material to be sensitized is bathed in a solution containing 1 milligram of 1.1'-diethyl-$\beta$-anthrathiomesoethyl-carbocyanine-bromide in 50 parts of an aqueous solution of methanol of 50 per cent strength for about 5 minutes and is then dried; it is then ready for use.

The dyes are suitable for sensitizing an emulsion made according to the boiling process, as well as for sensitizing an emulsion made according to the ammonia process.

It is to be understood that our invention is not limited to the foregoing examples or to the specific details given therein. Numerous other embodiments are possible and we contemplate as included within our invention all such modifications and equivalents as fall within the scope of the appended claims. So, for instance, the different nuclei may contain one or more substituents. The nomenclature used is arbitrary, but it is familiar to every chemist skilled in the art and has the advantage of clearness. The formulae of the dyes as given herein represent the molecular structure of our new dyes so far as known. If, however, in future it should become evident that the formulae do not exactly correspond to the dyes this fact will not affect our invention since the dyes will be easily identified by the method of producing the same which has been fully described in the examples and is analogous to known methods.

What we claim is:

1. A photographic material comprising a silver halide emulsion containing a dye selected from the group consisting of bis-[3-alkyl-anthraceno, phenanthreno, fluoreno, chryseno and acenaphtheno-thiazole-(2)]-trimethine-cyanine salts.

2. A photographic material comprising a silver halide emulsion containing a dye selected from the group consisting of bis-[3-alkyl-anthraceno, phenanthreno, fluoreno, chryseno and acenaphtheno-thiazole-(2)]-$\beta$-alkyl-trimethine-cyanine salts.

3. A photographic material comprising a silver halide emulsion containing bis-[3-ethyl-acenaphtheno-5'.4': 4.5-thiazole-(2)]-$\beta$-methyl-trimethine-cyanine bromide corresponding with the formula:

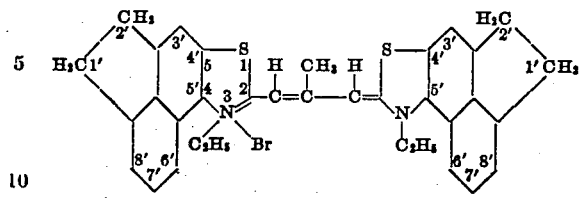

4. A photographic material comprising a silver halide emulsion containing bis-[3-ethyl-anthraceno-1'.2': 4.5-thiazole- (2)]-β-ethyl-trimethine-cyanine bromide corresponding with the formula:

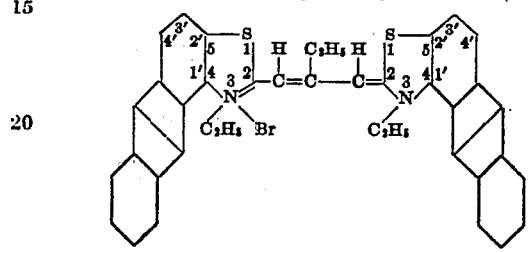

5. A photographic material comprising a silver halide emulsion containing bis-[3-ethyl-anthraceno-2'.1': 4.5-thiazole- (2)]-β-ethyl-trimethine-cyanine-bromide corresponding probably to the formula

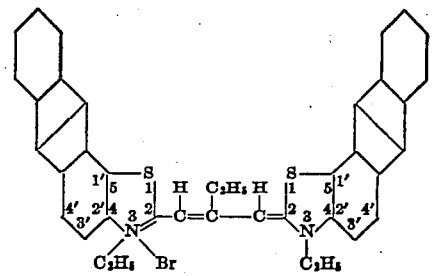

WALTER ZEH.
WILLI GAEDKE.
MARTIN DABELOW.
WERNER ZERWECK.